June 24, 1941.   M. C. DAILEY   2,247,221
GYPSUM PLASTER AND METHOD OF MANUFACTURE
Filed Oct. 30, 1937
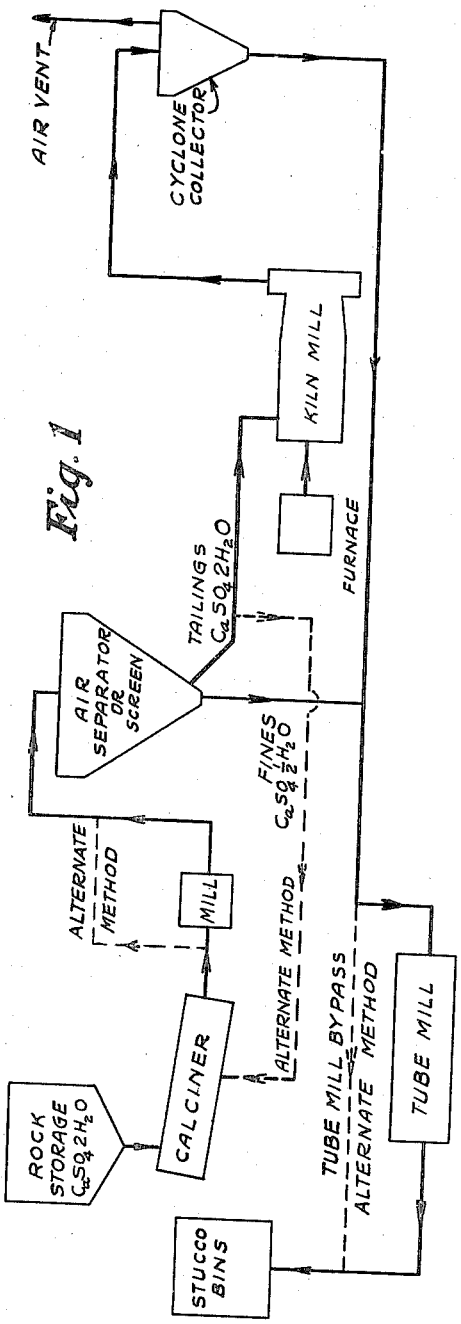
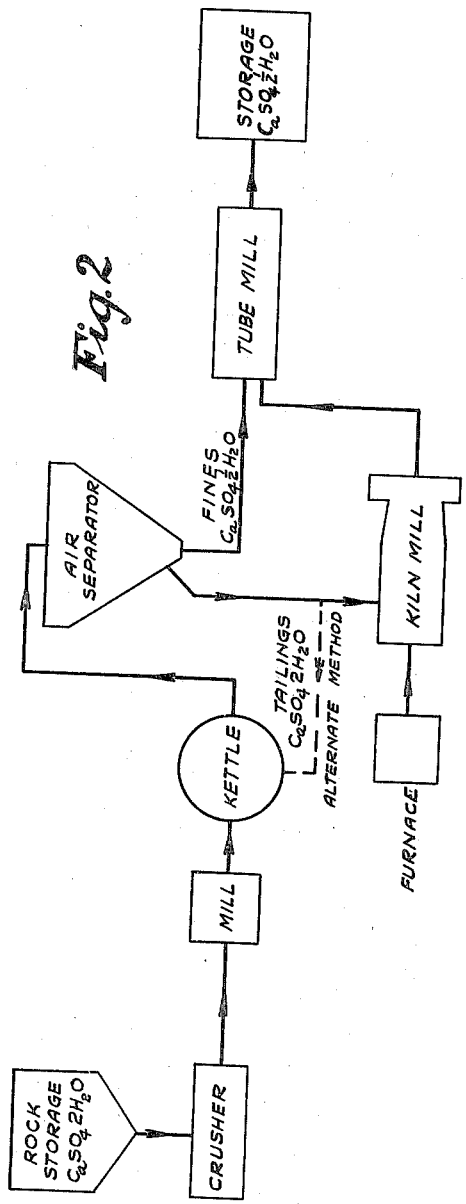
INVENTOR
MANVEL C. DAILEY
BY
L. A. Paley
ATTORNEY

Patented June 24, 1941

2,247,221

UNITED STATES PATENT OFFICE 2,247,221

GYPSUM PLASTER AND METHOD OF MANUFACTURE

Manvel C. Dailey, Maywood, Ill., assignor to United States Gypsum Company, Chicago, Ill., a corporation of Illinois Application October 30, 1937, Serial No. 171,818

11 Claims. (Cl. 23—122)

This invention relates to a gypsum plaster and its method of manufacture.

One of the usual methods of calcining gypsum consists of subjecting the coarsely ground rock to the action of heat in a rotary calciner. The calcination temperature, rate of feed, speed of rotation of the calciner and other factors are regulated so as to produce a discharge material averaging from four to six per cent moisture content. This corresponds roughly to slightly less than the amount of water required to be present in calcium sulphate hemihydrate depending upon the purity of the rock. The calciner discharges the material directly to a hammer mill or mill of similar type, for further size reduction. The mill discharge is fed to tube mills, for grinding to its final state of subdivision.

Ordinarily, rock crushed to a diameter of 2" and finer is fed to the calciner. It may be readily seen that, due to the irregularity in the size of the rock, the calcination of the various sized fractions will be non-uniform. In order to completely calcine the larger sized rock particles, it is necessary to overcalcine the fines. This process will, therefore, result in the production of a considerable amount of soluble anhydrite and even dead burned anhydrite if the temperature of the material discharged from the calciner is relatively high, or in the production of an excessive amount of calcium sulphate dihydrate if the temperature is too low. If the material is fed rapidly, or if it is non-uniform in size, the discharge from the calciner will container dead burned anhydrite, soluble anhydrite, hemihydrate and cores of uncalcined gypsum or dihydrate.

While several factors contribute to production of a non-uniformly calcined gypsum as disccharged from a rotary calciner, the major factor is the large variation in particle size of rock as fed to the calciner. Efforts have been made to eliminate or reduce the effect of this variable by feeding rock uniformly graded as to size to the calciner. Improved results are obtained by feeding a rather coarse, uniformly graded rock to the calciner, such rock screening say between 3/8"-1/2" in diameter. This practice is, however, uneconomical inasmuch as a considerable proportion of fines are formed during primary and secondary crushing of the rock which must be utilized along with the coarser rock. If the rock is all finely ground prior to calcination, say to all pass a 20 mesh screen, 85 per cent passing a 100 mesh screen, other troubles are encountered in the calciner. Such uniformly fine material tends to build up in the calciner, forming a rather deep bed. As depth of this bed reaches a critical point, rotation of the calciner combined with "boiling" action of the calcining gypsum, causes surges. These surges are evidenced by the deep bed suddenly giving way with very rapid passage of a considerable amount of the calcining gypsum through a considerable length of the calciner. In other words, with a uniformly fine ground gypsum being fed to the calciner at a uniform rate of feed, the discharge from the calciner will not be uniform. Material discharging between "surges" will be overcalcined, while a considerable portion of that discharging during surges will be definitely undercalcined. Practical experience has shown that "surging" may be largely eliminated by feeding to the calciner a rock mixture graded in size from fine to coarse. Presence of a considerable proportion of coarse rock in the calciner feed keeps the mass free flowing and prevents violent boiling of the mix, thereby allowing the calcining gypsum to flow uniformly through the calciner. While calcination of such a mixture is not uniform as respects different size fractions comprising the mixture, conditions may be so maintained that the final processed stucco considered as a whole is fairly uniform in physical and chemical characteristics. This is not true when calciner surges are experienced.

To illustrate the effect of variation in particle size upon uniformity of calcination of a rotary calciner, the following table shows results of moisture tests made upon calciner discharge stucco of varying particle size. In making these tests material discharging from a commercial rotary calciner during normal operation was screened through a series of standard screens of mesh sizes indicated. The fractions so obtained were cooled and tested for combined moisture.

Rock purity: 92.5 percent $CaSO_4 \cdot 2H_2O$

| Fraction size (calciner discharge material) | Combined water | |
|---|---|---|
| | As found | Theor. for $CaSO_4 \cdot \frac{1}{2}H_2O$ |
| | Percent | |
| U. S. standard screen on 3 mesh | 9.7 | 5.73 |
| 3–10 mesh | 6.5 | 5.73 |
| 10–40 mesh | 5.4 | 5.73 |
| 40–100 mesh | 4.3 | 5.73 |
| Thru 100 mesh | 3.9 | 5.73 |

It is evident from these tests that calciner discharge material screening finer than 10 mesh is definitely overcalcined; material coarser than 10 mesh being considerably undercalcined. It should be noted here that the larger rock particles as discharged from the calciner usually consist of a surface coating of soluble anhydrite, an intermediate layer of hemihydrate, and a core of uncalcined gypsum. The fines (—100 mesh) consist largely of soluble or dead burned anhydrite. As will be shown, the presence of dead burned anhydrite, soluble anhydrite, and calcium sulphate dihydrate in a plaster composition results in several undesirable properties namely, poor aging characteristics, irregular and unstable setting qualities, inferior working qualities and poor sand carrying capacity.

An object of this invention therefore, is to produce by means of standard equipment, a plaster containing a greater proportion of calcium sulphate hemihydrate than has heretofore been commercially feasible of production in a rotary calciner.

Another object of my invention is to produce by standard equipment a purer calcium sulphate hemihydrate than is normally obtainable by standard commercial production methods and at the same time, reduce the cost of calcination.

Further objects of my invention are to produce a calcined gypsum suitable for use as plaster, which possesses better plasticity and working qualities, better strength, and better aging characteristics than present plasters; also to improve gypsum plaster and its method of manufacture in other respects hereinafter specified and claimed.

Reference is to be had to the accompanying drawing forming a part of this specification, in which Figure 1 is a diagrammatic flow sheet of my improved method of manufacture, dotted lines indicating slight modifications, and Fig. 2 is a diagrammatic flow sheet of a modification of the method.

The various hydrates of calcium sulfate differ in specific gravity and hardness, and it is upon this difference that my method of producing relatively pure calcium sulphate hemihydrate is based. In the practice of my invention, I admit crushed gypsum rock, about 2" maximum diameter and smaller, to a rotary calciner. The temperature distribution in the calciner will be governed by several variable factors, some of which have been mentioned, but I have found that under average conditions I can obtain a product having the desired characteristics by so controlling rate of firing, rate of feed, and speed of rotation of the calciner, that calcined gypsum discharged therefrom will be at an average temperature of approximately 300-320° F. By employing a material discharge temperature of approximately 300°, the formation of appreciable amounts of soluble anhydrite or dead burned material is inhibited and largely prevented.

In normal operation the calciner discharge material is fed to a hammer mill or a mill of similar type, where it is reduced to a particle size of about 2000 microns and smaller. According to my method, the larger particles of gypsum rock admitted to this mill are only partially converted to calcium sulphate hemihydrate and are practically free from soluble anhydrite due to the low calcining temperature employed. The larger rock particles discharging from the calciner consist essentially of a raw gypsum core, with a surrounding layer of calcium sulphate hemihydrate. Under the action of the mill, the softer and more friable calcium sulphate hemihydrate is separated from the harder core of calcium sulphate dihydrate. While this separation is not complete, it is sufficient for all practical purposes. The mill discharge is fed to a conventional air separator or scalping screen. If desired, the discharge from the rotary calciner may be sent directly to the air separator without passing through the hammer mill. The calcium sulphate hemihydrate comprising the finer portion of the feed to the air separator or screen is separated therein from the uncalcined cores of dihydrate.

The calcium sulphate hemihydrate discharge from the air separator may be fed to a tube mill or a similar means of fine grinding, for further grinding to its final state of subdivision. The tailings from the air separator or screen, consisting mainly of calcium sulphate dihydrate, may be returned to the rotary calciner for recalcining or preferably are subjected to the combined grinding and calcining action of a conventional kiln mill, wherein the material is reground to any desired size and its calcination completed.

If calcination of tailings from the screen or air separator is completed by repassing same through the calciner, it is desirable that such tailings enter the calciner at a point fairly close to the discharge end of the calciner. If these tailings are fed to the calciner with the raw feed they will be over-calcined to a considerable extent during their second passage through the calciner, due to the fact that the tailings are already partially calcined, and of comparatively small average particle size. The point at which separator tailings shall enter the calciner will vary with different installations, being dependent upon temperature distribution in the calciner, speed of rotation, type of firing employed, average particle size of tailings, their degree of calcination, etc. Ideally, the point of reentry of tailings to the calciner is so selected that the tailings are practically completely calcined by the time they reach the discharge end of the calciner, without production of appreciable amount of overcalcined material. Normally this point will be about ⅓ the distance from the discharge end of the calciner.

Any suitable means (not shown) for effecting feed of tailings to the calciner at a point intermediate between feed and discharge end may be employed. For example, suitable openings may be made in the calciner shell at point of entrance of the tailings. A stationary shell section, bearing against seal rings bounding the opening, encloses the lower part of the calciner opening and is provided at the top with suitable feeding means. Instead of this arrangement, two rotary calciners may be used in series, with the tailings being fed to the second calciner, together with incompletely calcined material as discharged from the first calciner. With this arrangement, the second calciner is so designed and operated that tailings fed to it are completely calcined but not overburned.

More definite control of completion of calcination of tailings is effected by use of a kiln mill for this purpose. In a mill of this type, further grinding of the tailings from the air separator is effected, preferably to a fineness of 85-90 per cent thru 100 mesh, or finer. Simultaneously, completion of calcination takes place, by supplying sufficient heat to the air stream carrying the material through the mill to effect calcination. Preferably, such a mill is equipped with a separate furnace for supplying hot gases required to complete calcination; however, discharge gas from the calciner, or from other sources may be employed for this purpose. Further advantages of the kiln mill are; (1) no reduction in calciner capacity results from its use; (2) there is no possibility of a recirculating load being built up in the calciner; (3) a finer grind on material going to the tube mill is obtained and (4) very accurate control on calcination is possible.

In this connection it should be noted that kiln mills of the usual commercial types have not proven satisfactory for complete calcination and grinding of raw gypsum. The resultant product, starting with raw gypsum, is always quick setting, due to inability of this type mill to effect complete calcination of raw gypsum during the short time interval the material is exposed to hot gases in the mill. Air separator tailings from rotary calcined gypsum are successfully handled in such a mill, due to the fact that such tailings are generally partially calcined or are practically at calcination temperature when fed to the mill. The remaining combined moisture is rapidly liberated and complete calcination effected during the short time such produce is in the mill.

The material discharged from the kiln mill may, if so desired, be fed to the same tube mill used to grind the calcium sulphate hemihydrate obtained as fines from the air separator. However, if a product having different qualities is desired, the materials are not mixed, and the discharge from the kiln mill is stored separately. Fineness of grind to any desired degree is readily obtained in the kiln mill. When the materials have been reduced to their final state of subdivision, they are then transferred to bins or sacked for storage. The plaster produced according to this method contains 15–20% ultra fines which are finer than 2 microns, and 70–80% which is finer than a 325 mesh screen.

The following tests were made to illustrate effect of overcalcination of "fines" upon plaster quality and to demonstrate quality improvement obtained by practice of my invention.

Material discharged from a calciner was screened through an 80 mesh screen, the −80 mesh portion being further reground in a small ballmill for a period of time sufficient to obtain a final grind on the product equivalent to that obtained under normal mill operation. In run #1, material discharging from the calciner was representative of normal production. In run #2, calciner discharge temperature was reduced to a point such that severe overburning of the fines did not occur. The only difference in calciner operation between runs #1 and 2 was in rate of firing, which in turn affected degree of calcination of the discharge material. Operation of the calciner during run #2 was such as is used in practice of my invention.

Test results on −80 mesh fractions of calciner discharge material taken from each run are shown in the following table; also test results on these same plasters reground to normal plaster fineness in a ball mill. Treatment of material representative of both runs was identical.

|  | Run #1 | Run #2 |
|---|---|---|
| Tests on −80 mesh fractions: |  |  |
| Calciner discharge temp _____° F__ | 350 | 325 |
| Combined H₂O _____percent__ | 3.59 | 5.18 |
| Grind _____percent thru 100 mesh__ | 90.8 | 91.0 |
| Tests on ballmilled samples: |  |  |
| Time of set _____minutes__ | 21 | 22 |
| Normal consistency ____cubic centimeters__ | 70 | 83 |
| Mortar consistency _____do____ | 68 | 81 |
| Workable cons. range _____do____ | 10 | 24 |
| Sand carrying capacity _____parts__ | 3 | 4½ |

In the above tests:

Time of set was determined in accordance with A. S. T. M. standard method of testing.

Normal consistency is defined as the number of c. c. of water required to be mixed with 100 grams of dry powder to produce a slurry of such consistency that it will just pour from a cup.

Mortar consistency is defined as the number of c. c. of water required to be mixed with a dry mix of 100 grams plaster and 300 grams standard plastering sand to produce a mortar of such consistency, that, when a 2″x4″ brass cylinder mold is filled with the mortar and struck off level, the mortar will slump ½″ upon careful removal of the mold.

Workable consistency range is defined as the range in c. c. of water required per 400 grams of a 1:3 plaster-sand mix to produce a mortar ranging from heavy to thin application consistency.

These tests prove that plaster prepared from calciner discharge fines of moisture content approaching theoretical for hemihydrate (run #2) is of much better quality than plaster produced similarly from calciner fines representative of normal calciner operation, which of necessity contains considerable proportions of overcalcined material. Run #2 plaster was of higher consistency, more plastic, stickier, and carried more sand than run #1 plaster. It is evident from these tests that overcalcination is detrimental to plaster quality.

It is not my purpose to limit the scope of this invention to the use of a rotary calciner, as it may be seen that this method may be equally well adapted to the well known kettle method of calcination (Fig. 2). When the kettle method of calcination is used, the material is more finely ground prior to calcination. Therefore, the kettle discharge material is not ground in a hammer mill after calcining, but is fed directly to an air separator or screen, the method from that point on being identical with the process hereinbefore described.

When calcined gysum is ground in a tube mill, the discharged material normally contains a considerable proportion of coarse particles which are known as tube mill flakes. These "flakes" contain core centers of uncalcined gypsum or dihydrate and are probably formed by very fine hemihydrate particles building up on these cores, being loosely cemented thereto by the action of steam released from such gypsum particles by the heat of friction during the ballmilling process. Tubemilled calciner stucco produced by present methods generally contains from 20–40 percent of such flakes (material retained on 40 mesh screen). When mixed with water, or sand and water in the preparation of plaster mortars, such flakes disintegrate to some extent, but often times the plaster so mixed still contains 10–20 percent of hard flake cores which add nothing to the strength or cementing characteristics of the plaster and may be considered as so much inert aggregate. It has been observed that when gypsum is calcined according to the teachings of my invention, the number and size of the tubemill flakes are markedly decreased. Such flakes as are formed are in the form of soft balls or pellets of material, much softer than normal tubemill flakes, and readily broken down by mixing with water, or sand and water, so that the entire amount of plaster is utilized. The resultant product is stronger, richer working, more plastic, and capable of being used with a greater proportion of sand than tubemilled plaster produced by former methods.

Further advantages in quality are derived from practice of this invention in uniformity of setting time of plaster as prepared according to this process. The setting time of plaster containing large tube mill flakes with raw gypsum nuclei, is liable to be irregular and non-uniform. Under vigorous mixing, such cores are exposed and exert a decided accelerating effect on the setting time of the plaster. With slight mixing, the cores remain protected by their hemihydrate coating; hence in this case the plaster will not be accelerated, and its time of set will be slower. Further, plaster from tube mills is at a relatively high temperature as it goes to storage bins, temperature frequently being in excess of 300° F. Under such conditions, continued calcination of raw gypsum present results in liberation of steam in conveyors, elevators, bins, etc. This moisture condenses on the sides of such equipment, where it combines with hemihydrate to form gypsum with consequent contamination of the finished product, set acceleration, etc. By eliminating practically all raw gypsum from tubemilled stucco in accordance with my invention these difficulties are eliminated.

In employing my invention, feed entering the tube mill is of considerably finer grind than is normal for ordinary rotary calciner mill operation. I prefer to so regulate air separator setting and kiln mill grind that the stucco entering the tube mill is ground to a fineness of approximately 100 percent thru 40 mesh, 85 percent or finer thru 100 mesh. By this practice, any traces of raw gypsum present in the fine feed to the tube mill are calcined to hemihydrate in the tube mill and do not form nuclei for formation of large tube mill flakes, or remain as gypsum to cause trouble in the finished product.

It should be noted that all of the equipment employed in my method is of the type commonly found in well equipped plaster mills. A marked economy will be observed in fuel cost, due to the lower temperatures employed in calcination. Maintenance costs on calciner liners, kettle bottoms, etc., are also reduced, due to lower extremes of temperature. When ordinary plaster of Paris is compared with the material produced by my method, it will be found that the latter has much better plasticity, sand carrying capacity and working qualities, and that it is more resistant to loss of plasticity, sand carrying capacity, and changes in setting time with age.

I would state in conclusion that while the illustrated examples constitute practical embodiments of my invention, I do not wish to limit myself precisely to these details, since manifestly the same may be considerably varied without departing from the spirit of the invention as defined in the appended claims.

Having thus described my invention, I claim as new and desire to secure by Letters Patent:

1. The method of preparing calcined gypsum, which comprises reducing gypsum rock to substanitally coarse particles, calcining said reduced rock under time and temperature conditions sufficient to calcine a substantial part of the exterior only of said particles to form calcium sulphate hemihydrate, crushing the product, air separating the crushed product to substantially separate calcined fines and uncalcined tailings thereof according to particle size, and completing calcination of said tailings.

2. An additional step in the method as described in claim 1, comprising grinding said calcined tailings.

3. The method of preparing calcined gypsum, which comprises crushing gypsum rock to convenient size, incompletely calcining said rock in a rotary calciner to produce substantially no anhydrite, a substantial quantity of calcium sulphate hemihydrate, and some raw gypsum, crushing said incompletely calcined material, air separating said crushed material to separate the fines from the tailings of uncalcined gypsum, tube milling the fines to form a plaster having stable setting qualities and high sand carrying capacity, and completing calcination of the separated tailings by introducing said tailings into said rotary calciner at a point between the ends thereof.

4. The method of preparing calcined gypsum, which comprises crushing gypsum rock, rotary calcining said rock to an incomplete degree, crushing the discharge from the calciner, air separating said material to separate the fines from the tailings of uncalcined gypsum, completing calcination of said tailings and grinding to a finer size in a kiln mill, and regrinding the kiln milled tailings and the fines from said air separation.

5. The method of preparing calcined gypsum, which comprises crushing and grinding gypsum rock, incompletely kettle calcining said ground material, air separating said calcined material to separate the fines from tailings of uncalcined gypsum, kiln milling said tailings, and tube milling the kiln milled tailings and the fines from said air separation to produce plaster composed largely of ultrafine calcium sulphate hemihydrate.

6. The method of preparing calcined gypsum, which comprises crushing and grinding gypsum rock, incompletely kettle calcining said ground material, air separating said calcined material to separate the fines from tailings of uncalcined gypsum, returning said tailings to said kettle for completion of calcination, and tube milling the fines from said air separation to produce plaster composed largely of ultrafine calcium sulphate hemihydrate.

7. The method of preparing calcined gypsum, which comprises incomplete calcination of raw gypsum of varying particle size, substantial separation of calcined and uncalcined portions thereof, and calcination of said uncalcined portions.

8. The method of manufacturing calcium sulphate hemihydrate in a form suitable as a plaster which comprises crushing gypsum (calcium sulphate dihydrate) to form relatively coarse particles, heating the same at a temperature sufficiently high to calcine the outer portions of said particles to form calcium sulphate hemihydrate while retaining the cores of said particles in the form of dihydrate, the temperature being chosen low enough to prevent substantial formation of calcium sulphate containing less combined water than the hemihydrate, separating the thus formed mixture into hemihydrate and dihydrate particles, and further calcining the still unchanged dihydrate to convert it into the hemihydrate.

9. The method of manufacturing calcium sulphate hemihydrate in a form suitable as a plaster which comprises crushing gypsum (calcium sulphate dihydrate) to form relatively coarse particles, passing the latter through a heated zone at a temperature sufficiently high to calcine the outer portions of said particles to form calcium sulphate hemihydrate while retaining the cores of said particles in the form of dihydrate, the temperature being chosen low enough to prevent substantial formation of calcium sulphate containing less combined water than the hemihydrate, separating the thus formed mixture into hemihydrate and dihydrate particles, further calcining the still unchanged dihydrate to convert it into the hemihydrate, and blending the latter with the separated hemihydrate.

10. The method of manufacturing calcium sulphate hemihydrate plaster substantially free from other forms of calcium sulphate which comprises calcining gypsum (calcium sulphate dihydrate) at a temperature and for a time sufficient to convert a large portion of it into the hemihydrate stage but without the formation of any substantial amounts of calcium sulphate containing less combined water than the hemihydrate, separating from the resulting product the still unconverted dihydrate, and calcining the latter to form further quantities of hemihydrate.

11. The method of manufacturing calcium sulphate hemihydrate plaster substantially free from other forms of calcium sulphate which comprises calcining gypsum (calcium sulphate dihydrate) at a temperature and for a time sufficient to convert a large portion of it into the hemihydrate stage but without the formation of any substantial amounts of calcium sulphate containing less combined water than the hemihydrate, separating from the resulting product the still unconverted dihydrate, calcining the latter to form further quantities of the hemihydrate, and conjointly grinding the hemihydrate from the first and second calcinations.

MANVEL C. DAILEY.